(No Model.)
T. R. ROULSTONE.
ADJUSTABLE SUPPORT FOR SCHOOL FURNITURE.
No. 508,557. Patented Nov. 14, 1893.
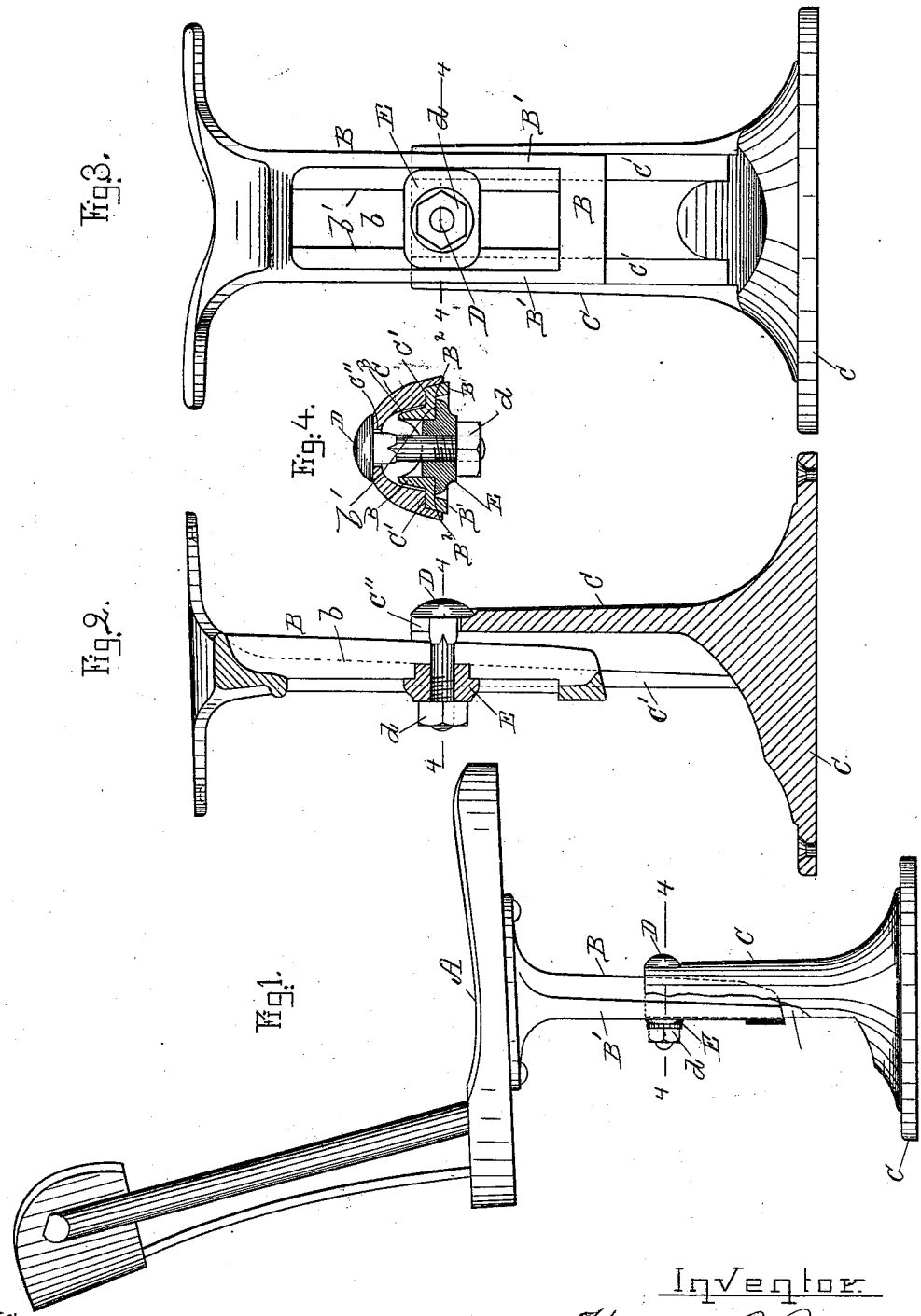

UNITED STATES PATENT OFFICE.

THOMAS R. ROULSTONE, OF SOMERVILLE, MASSACHUSETTS.

ADJUSTABLE SUPPORT FOR SCHOOL FURNITURE.

SPECIFICATION forming part of Letters Patent No. 508,557, dated November 14, 1893.

Application filed July 19, 1893. Serial No. 480,933. (No model.)

*To all whom it may concern:*

Be it known that I, THOMAS R. ROULSTONE, a citizen of the United States, and a resident of Somerville, in the county of Middlesex and State of Massachusetts, have invented new and useful Improvements in Adjustable Supports for School Furniture, of which the following, taken in connection with the accompanying drawings, is a specification.

This invention relates to improvements in adjustable supports for school furniture, such as desks, chairs, seats, &c., and it has for its object to adjust and regulate the height of such school furniture according to the size of the pupil for which it is to be used.

The invention is carried out as follows, reference being had to the accompanying drawings, wherein—

Figure 1 represents a side elevation of the invention showing a portion of the stationary base as broken away. Fig. 2 represents a vertical longitudinal section of the same. Fig. 3 represents a rear view; and Fig. 4 represents a cross-section on the line 4—4 shown in Figs. 1, 2, and 3.

Similar letters refer to similar parts wherever they occur on the different parts of the drawings.

In the drawings I have shown the invention as applied to a chair, but it is equally well adapted for desks, stools or other furniture as may be desired without departing from the essence of my invention.

A represents the seat to the under side of which is secured in a suitable manner a vertically slotted shank B, on which $b$ represents the vertical slot. The shank B has at its sides vertical ribs B', B' which are slightly tapering from top to bottom and said ribs are adapted to be guided in correspondingly tapered guide grooves C', C' in the stationary standard or base portion C which is adapted to be secured to the floor in any suitable or practical manner. The standard C is preferably semi-circular or nearly so in section, and has at or near its upper end a notch or perforation C'' adapted to receive the headed end of the screw bolt D which passes through the slot $b$ and a vertical washer E spanning the rear side of the slotted shank B, outside of which the said screw bolt E is provided with a fastening nut $d$ as shown in the drawings. If it is desirable to adjust the height of the furniture all that is necessary to do is loosen the nut $d$ sufficiently to permit the shank B to be moved up or down the proper distance relative to the base C and when so adjusted the parts are readily secured in position simply by tightening the nut $d$. By having the ribs B', B' on the shank B tapering from the top downward it will readily be seen that the downward pressure on the said shank B causes the latter to be firmly as it were, wedged against the tapering guide grooves C' in the base portion C, thus preventing any slip and causing the said shank B to be held firmly in its adjusted position relative to the said base C.

In practice I provide the rear side of the shank B with vertical lips or ledges $B^2$ between which the washer E fits loosely and is thereby prevented from turning round while adjusting the nut $d$.

Having thus fully described the nature, construction, and operation of my invention, I wish to secure by Letters Patent and claim—

1. An adjustable support for school furniture, consisting of a base portion C having vertical guides C' and a notch C'' at its upper end, a shank B having a vertical slot $b$, guide ribs B' and vertical lips or ledges $B^2$, a clamping bolt D detachably fitting within the notched upper end of the base portion and extending through the vertical slot in the shank, a washer E bearing against the vertical lips or ledges of the shank, and a nut $d$ engaging the bolt and bearing against the washer, substantially as described.

2. An adjustable support for school furniture, consisting of a base portion C having vertically tapering guides C' and a notch C'' at its upper end, a shank B having a vertical slot $b$ and tapering guide ribs B' fitting the tapering guides of the base portion, a clamping bolt D engaging the notched upper end of the base portion and extending through the vertical slot in the shank, a washer E bearing against the shank, and a nut $d$ engaging the bolt and bearing against the washer, substantially as described.

3. An adjustable support for school furniture, consisting of a base portion C having vertical tapering guides C', a shank B having a vertical slot and tapering guide ribs B' fitting the tapering guides of the base portion, and a clamping bolt engaging the base portion and extending through the vertical slot in the shank, substantially as described.

In testimony whereof I have signed my name to this specification, in the presence of two subscribing witnesses, on this 15th day of July, A. D. 1893.

THOMAS R. ROULSTONE.

Witnesses:
ALBAN ANDRÉN,
WILLIAM W. SUMMERS.